United States Patent [19]

Ramey

[11] Patent Number: 5,306,371
[45] Date of Patent: Apr. 26, 1994

[54] APPARATUS AND METHOD TO RELEASE A FILAMENT WOUND TUBE FROM A MANDREL

[75] Inventor: Roy R. Ramey, Forest, Va.

[73] Assignee: The Babcock & Wilcox Company, New Orleans, La.

[21] Appl. No.: 841,955

[22] Filed: Feb. 26, 1992

[51] Int. Cl.⁵ ............................................. B65H 81/00
[52] U.S. Cl. ................................... 156/171; 156/173; 156/169; 156/425; 156/289
[58] Field of Search .............. 156/169, 171, 173, 175, 156/425, 584, 344, 289

[56] References Cited

U.S. PATENT DOCUMENTS 3,796,620 3/1974 Dunn ................................ 156/171
3,874,970 4/1975 Dunn ................................ 156/171
4,921,557 5/1990 Nakamura ........................ 156/169

OTHER PUBLICATIONS

Fisher, G. A., IBM Technical Disclosure Bulletin, "Electric Motor Armature," vol. 6, No. 6, Nov. 1963, pp. 50 and 51.

Primary Examiner—Jeff H. Aftergut
Attorney, Agent, or Firm—Robert J. Edwards; Vytas R. Matas; Daniel S. Kalka

[57] ABSTRACT

An apparatus and method for releasing a filament wound tube (4) from a mandrel (1) utilizing a removable fiber (2) covered with a wrap (3). After a tube is filament wound, the removable fiber (2) is pulled out from beneath the wrap (3) to create a plane of slippage between the mandrel (1) and tube (4) to provide for easy removal.

13 Claims, 4 Drawing Sheets

APPARATUS AND METHOD TO RELEASE A FILAMENT WOUND TUBE FROM A MANDREL

BACKGROUND OF THE INVENTION

1. Field of the Invention

The present invention relates generally to releasing filament wound tubes from a mandrel, and more particularly to an apparatus and method for releasing a filament wound tube from a mandrel employing a removable fiber.

2. Description of the Related Art

Filament wound tubes are fabricated by winding a fiber around an axisymmetric rotating mandrel in a predetermined manner. The fiber is guided onto the mandrel using roller guides that are moved back and forth axially along the mandrel as is well known in the art. By coordinating the positions of the guides and mandrel, it is possible to wind a geometric pattern with the fiber oriented in a specific direction.

Because of friction between the mandrel and the tube, it is not possible to remove the tube from the mandrel unless some type of slippage plane exists therebetween. Attempts to force a tube off a mandrel typically cause significant damage to the tube.

One prior art approach of releasing a filament wound tube from a mandrel is to coat the mandrel with a lubricant containing spray. This approach is successful with short tubes having small diameters such as about six inches long and about one and a half inches in diameter.

Another prior art approach employs the use of collapsible or semi-collapsible mandrels. The mandrels are disassembled fully or partially and withdrawn from the completed filament wound tube. Ordinarily these devices are expensive particularly when their shape is complex.

Still other prior art approaches use tubes or covers for the mandrel such as cardboard tubes or wrapping the mandrel with multiple layers of a wrap made from plastic or polytetrafluoroethylene to create a slippatge plane. Experience has shown that long tubes, for example, twenty-four (24) inches or longer cannot be slipped off a mandrel even when three layers of a plastic wrap is applied.

Thus, there is a need for an apparatus and method for releasing a filament wound tube from a mandrel that allows short or long tubes to be easily removed from a mandrel without damage to the tube. The method and apparatus should be inexpensive, easy to use, and reliable.

SUMMARY OF THE INVENTION

The present invention solves the aforementioned problems with the prior art as well as others by providing an apparatus and method for releasing a filament wound tube from a mandrel by providing a removable fiber wound onto the mandrel prior to filament winding the tube and covering the removable fiber with a wrap. The removable fiber covers the length of the mandrel and extends beyond the planned length of the tube to be formed by filament winding.

Accordingly, one object of the present invention is directed to an apparatus for releasing a filament wound tube from a mandrel using a removable fiber.

Another object of the present invention is directed to a method for releasing a filament wound tube from a mandrel using a removable fiber.

Still another object of the invention is to provide a method and apparatus for releasing a filament wound tube from a mandrel using a removable, reusable fiber which is simple in design, rugged in construction, and economical to manufacture.

The various features of novelty characterized in the invention are pointed out with particularly in the claims annexed to and forming a part of this disclosure. For a better understanding of the invention, and the operating advantages attained by its uses, reference is made to the accompanying drawing and descriptive matter in which a preferred embodiment of the invention is illustrated.

DESCRIPTION OF THE PREFERRED EMBODIMENT

Figure 1:
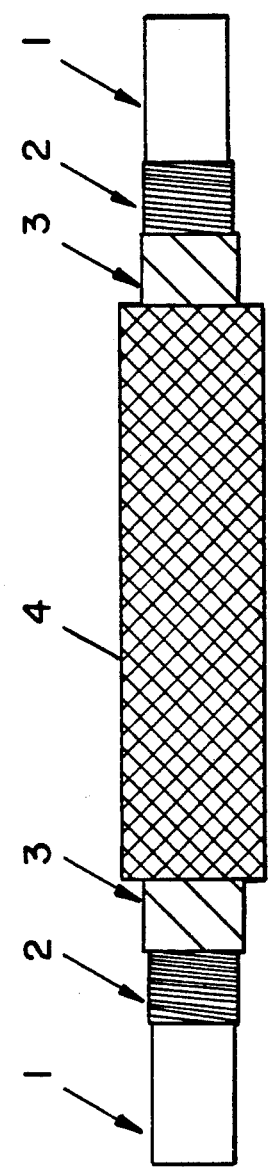
FIG. 1 is an elevated perspective view of the apparatus in accordance with the present invention.

Referring to the drawings where like numerals designate like or similar features throughout the several views and in particular to FIG. 1, prior to filament winding the product fiber into a planned tube, a removable fiber (2) is hoop filament wound onto the mandrel (1). A wrap (3) is then provided over the removable fiber (2). The length of the mandrel (1) covered by the removable fiber (2) and the wrap (3) is extended beyond the planned length of the tube (4) made from some product fiber as shown in the Figures. Upon completion of tube fabrication from the the product fiber, the removable fiber (2) is pulled from beneath the wrap (3). This creates a plane of slippage between the mandrel (1) and the tube (4) to provide for easy removal.

By way of example, a 30 pound test monofilament fishing line with a diameter of 0.022 inch was hoop wound onto a mandrel (1) in such a manner that the distance between the center lines of adjacent fibers was 0.026 inch apart. Plastic wrap, approximately three inches wide, was wrapped over the monofilament line in a helical fashion. A filament wound tube was fabricated in the manner well known in the art. Afterwards, the monofilament line was pulled out from beneath the plastic wrap.

The 0.026 inch center-to-center distance between adjacent fibers mentioned is not critical to performance. This distance was used as the fiber itself had a 0.022 inch diameter and it was desired to minimize the gap between adjacent fibers. A larger gap may be used provided the overlying wrap does not protrude into the gas as the product tube is filament wound. Protrusion of the wrap (3) increases the difficulty of removing the fiber (2).

Tubes ranging in size from about fifty-eight (58) inches long by about two (2) inches in diameter to about eleven (11) inches long by eleven (11) inches in diameter have been successfully removed from single piece mandrels using this invention. Hence, the length and diameter of the filament wound tube is not limited. The fifty-eight (58) inch tube utilized fifty pound test line as the removable fiber. The type of removable fiber, its diameter, and its strength are not limited to specific types in the performance of this invention. The removable fiber may consist of any material that has the following properties.

It must have chemical compatibility with the product tube (4). Plastic monofilament fishing line advantageously is employed when the product tubes contain an acidic liquid that leaks into the area where the removable fiber is located.

It must include sufficient strength since the product tube (4) is wound tightly around the removable fiber (2). Thus, there will be significant friction as the fiber is removed.

It must have a cylindrical or near-cylindrical shape. The removable fiber is twisted as it is withdrawn from beneath the product tube. If the fiber's shape is not cylindrical, then it will not be able to twist without binding.

The fiber does not necessarily have to be a monofilament line as it may consist of a number of fine filaments such as kite string or cord. The removable fiber may be made from materials such as cotton, nylon, or rayon as long as they meet the above criteria. It is also possible that several fibers be concurrently hoop filament wound onto the mandrel then simultaneously withdrawn after the product tube has been fabricated. Additionally while plastic wrap is given as one example, other suitable wraps include polytetrafluoroethylene tape, or various types of paper, e.g., kraft or waxed. The wrap overlying the removable fiber should be chemically compatible with the product tube, and have a smooth surface. Similarly, the mandrel may be rotating or not depending upon the filament winding process. While metal mandrels are preferred, the mandrel may be manufactured from any material exhibiting sufficient strength.

The present invention provides the following advantages. The removable fiber is inexpensive and reusable. The application of the fiber (2) and removal from a mandrel (1) may be made manually or automatically with microprocessor controls to provide for reduced labor costs. The use of a removable fiber allows for an inexpensive, single-piece mandrel.

Figure 2:
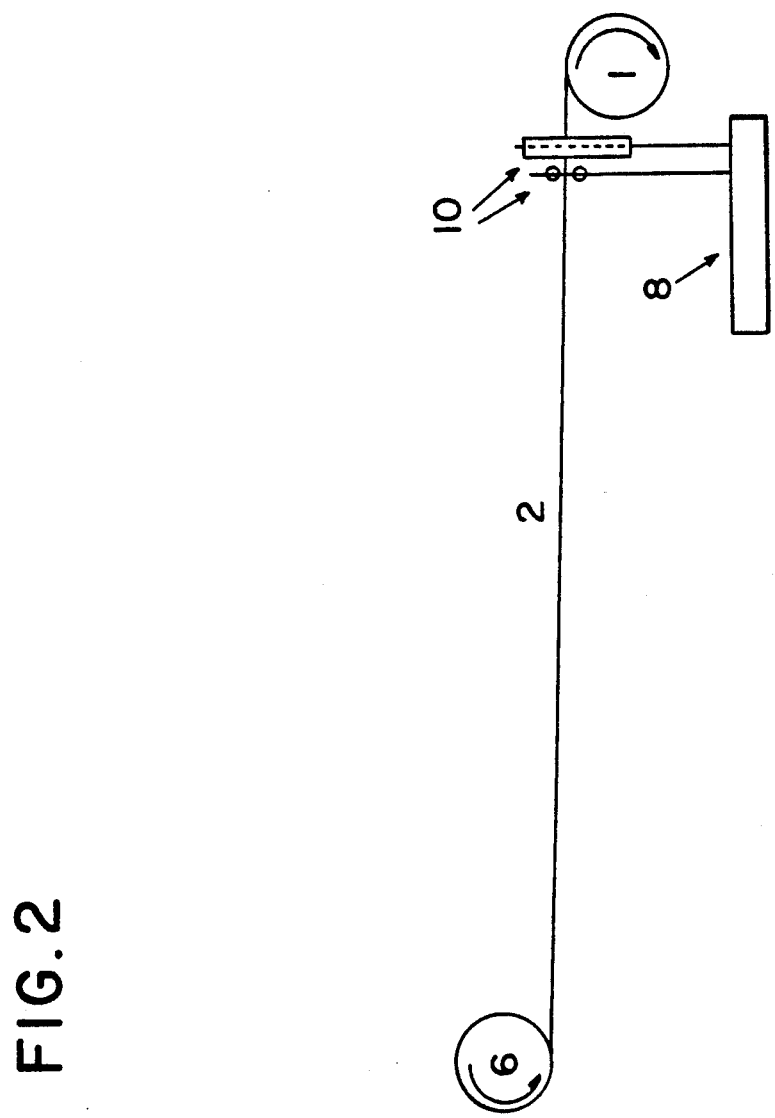
FIG. 2 is an elevated perspective schematic view illustrating one method for wrapping the removable fiber around the mandrel.

FIG. 2 shows one method of wrapping the mandrel with the removable fiber. The removable fiber (2) is hoop filament wound onto the mandrel (1) which is already installed onto the filament winder. The filament winder carriage (8) moves axially along the mandrel as it rotates. Attached to the carriage (8) are guide rollers (10) through which the fiber (2) passes. Hence, as the carriage (8) moves, the fiber (2) is laid down onto the mandrel (1) in a precise manner. For the 0.026" center-to-center distance between adjacent fibers described earlier in the present application, the carriage moves 0.026" as the mandrel completes one revolution.

Figure 3:
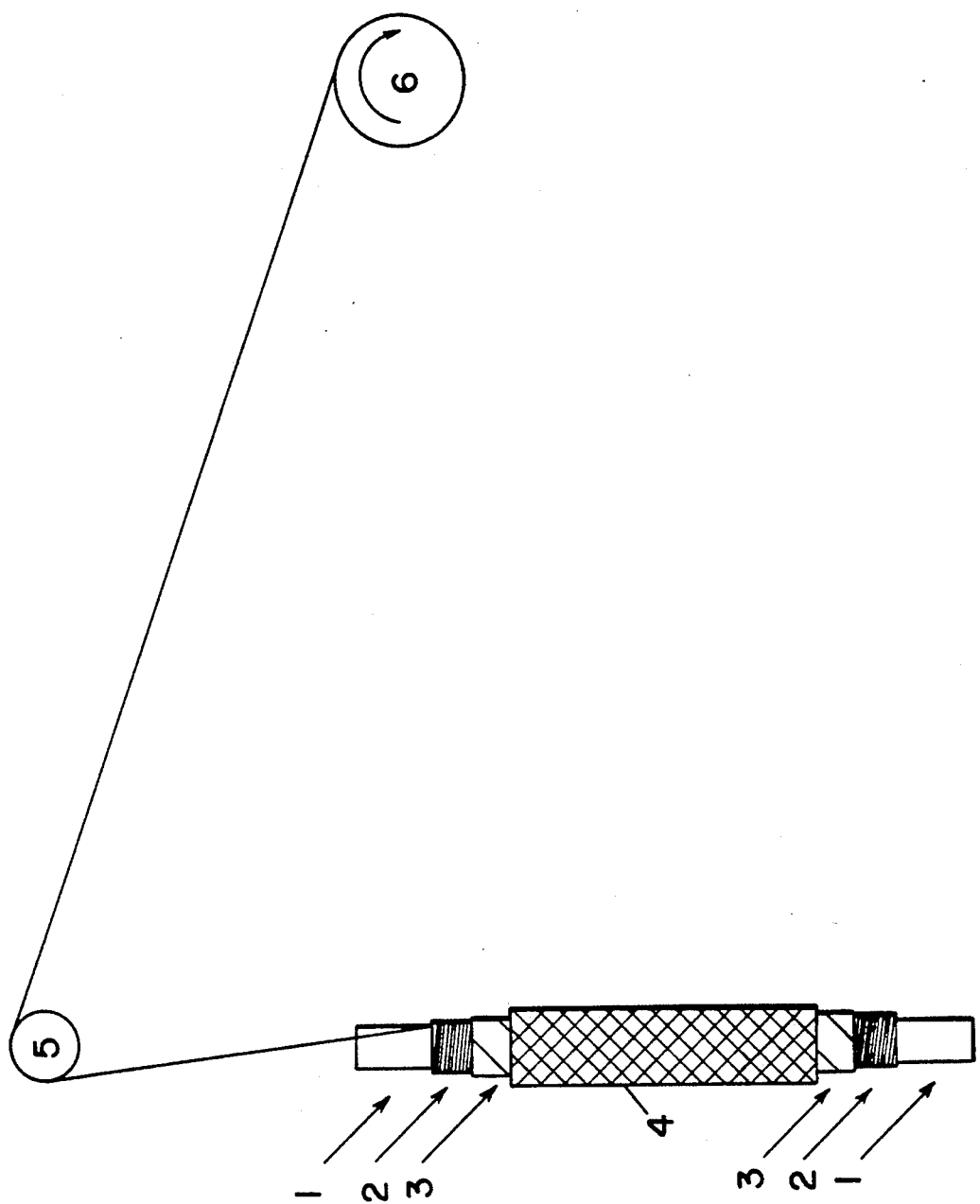
FIG. 3 depicts a schematic view of a method of withdrawing the removable fiber.

FIG. 3 illustrates one method of quickly withdrawing the removable fiber (2). The mandrel (1) containing the finished tube (4) is stood on end. The fiber is looped over a pulley (5) then attached to a bobbin (6) that is rotated to take up the fiber. This is the preferred method to remove the fiber (2). To provide a means of rotation, the bobbin (6) is attached to a filament winder (not shown).

Figure 4:
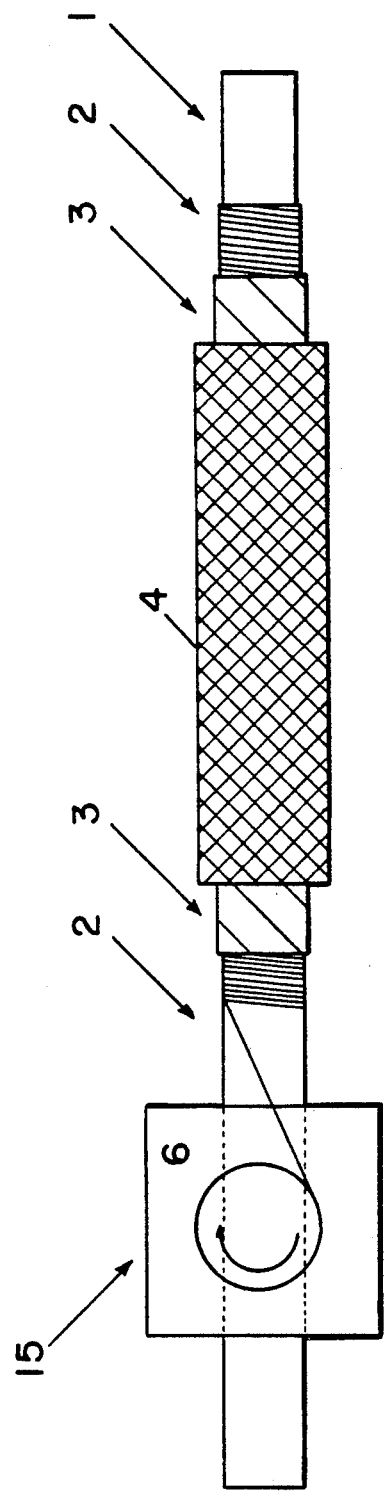
FIG. 4 depicts an alternate method of withdrawing the removable fiber.

FIG. 4 shows an alternate method of withdrawing the removable fiber (2). The fiber is wound on the bobbin (6) as it is removed from beneath the product tube (4). As the fiber is withdrawn, the fiber removal mechanism (15) must rotate around the mandrel (1), or the mandrel (1) must rotate beneath it.

The set-ups shown in FIGS. 3 and 4 could be used to automate the fiber removal operation using a microprocessor or a computer (not shown).

While a specific embodiment of the invention has been shown and described in detail to illustrate the applications and the principles of the invention, certain modifications and improvements will occur to those skilled in the art upon reading the foregoing description. It is thus understood that all such modifications and improvements have been deleted herein for the sake of conciseness and readability, but are properly within the scope of the following claims.

I claim:

1. An apparatus for releasing a filament wound tube, comprising:
    a mandrel for supporting a tube to be formed by filament winding at least one fiber, said mandrel being a length greater than a planned length of said filament wound tube to be formed;
    a removable fiber wound onto said mandrel prior to filament winding said at least one fiber, said removable fiber having a cylindrical shape and being wound onto said mandrel a predetermined length beyond the planned length of the tube to be formed, said removable fiber being wound so that each hoop is adjacent each other at a preset center-to-center distance;
    a wrap covering said wound removable fiber and in contact therewith, said wrap extending lengthwise on said wound removable fiber on said mandrel a length beyond the planned length of the tube to be formed, said wrap being a member selected from the group consisting of plastic wrap and paper wrap, said wrap having fabricated on a portion thereof a filament wound tube of said planned length; and
    means for pulling said removable fiber out from beneath said wrap after fabrication of the tube to provide for removal of the filament wound tube.

2. An apparatus as recited in claim 1, wherein said removable fiber is reusable.

3. An apparatus as recited in claim 1, wherein said removable fiber is a monofilament line.

4. An apparatus as recited in claim 3, wherein said monofilament line has a diameter of about 0.022 inch.

5. An apparatus as recited in claim 4, wherein said monofilament line is wound with center lines of adjacent lines being about 0.026 inch apart.

6. An apparatus as recited in claim 1, wherein said mandrel is rotatable.

7. An apparatus as recited in claim 1, wherein said pulling means includes a pulley and a bobbin with said bobbin being rotatable around an axis for pulling the removable fiber thereon across the pulley.

8. A method for releasing a filament wound tube, comprising the steps of:
    winding a removable cylindrical fiber lengthwise onto a mandrel constructed to support a tube and of a length greater than a planned length of the tube to be filament wound thereon so that the wound removable cylindrical fiber extends beyond the planned length of the tube to be filament wound thereon;
    then covering the removable cylindrical fiber with a wrap, said wrap extending a length beyond the planned length of the tube to be formed, the wrap being a member selected from the group consisting of plastic wrap and paper wrap;

fabricating a filament wound tube of the planned length on a portion of the wound removable cylindrical fiber covered with the wrap by filament winding; and pulling the removable cylindrical fiber out from beneath the wrap off of the mandrel to release the filament wound tube therefrom.

9. A method as recited in claim 8, wherein said removable fiber is reusable.

10. A method as recited in claim 9, wherein said removable fiber is a monofilament line.

11. A method as recited in claim 10, wherein said monofilament line has a diameter of about 0.022 inch.

12. A method as recited in claim 11, wherein said monofilament line is wound with center lines of adjacent lines being about 0.026 inch apart.

13. An method as recited in claim 8, wherein said winding step includes the step of rotating the mandrel.

* * * * *